Fig. 3

INVENTORS
WILLIAM H. JORGENSEN
BY WILLIAM GERALD TYSON

Wheeler, Wheeler + Wheeler
ATTORNEYS

United States Patent Office 2,845,639
Patented Aug. 5, 1958

2,845,639

CONTROL APPARATUS FOR DRILLING AND TAPPING MACHINE

William H. Jorgensen and William Gerald Tyson, Green Bay, Wis., assignors to Cleereman Machine Tool Co., Green Bay, Wis., a corporation of Wisconsin Application October 10, 1955, Serial No. 539,472

27 Claims. (Cl. 10—138)

This invention relates to an automatic drilling machine.

The invention resides in the structure and control apparatus of our drilling machine which renders it automatic in operation, both for drilling and tapping operations. The spindle feeding mechanism is novel to facilitate its being traversed at rapid speeds, both upwardly and downwardly. For this motion of the spindle we provide a rapid traverse motor independent of the source of power for the drilling and tapping feed motions of the spindle. The actuating connections are such, however, that the spindle motion for advancing the drill or tap against the work is powered from the main motor which is also connected to the gearing in the top head and by which the spindle is rotated.

The electric control circuit is such that the machine may be set for automatic drilling or automatic tapping cycles. In one embodiment of the invention the machine may also be set for a manual drilling cycle. In the automatic drilling and automatic tapping cycles the spindle will automatically rapidly traverse down until the tool reaches a position proximate the work whereupon the rapid traverse motor is de-energized and the spindle feed means energized from the main motor to continue advancing the tool at feeding or leading speeds. After the drill has completed its work in the automatic drilling cycle, it will be automatically rapidly traversed up to its initial position in readiness for a new cycle. If the machine is set for automatic tapping, the tap will automatically lead out of the work after the tapped hole has been completed.

The actuating mechanism subject to the control of the electric circuit is also novel and includes control rods which are axially shifted to open and close limit switches in response to the axial movement of the spindle. We provide a novel magnet ring axially movable on one control rod and which cooperates with a fixed collar on the rod and with a control arm mounted on the spindle quill to govern and control the axial movement of the rod and the resultant actuation of the circuit switches.

We also make provision for optionally introducing dwell in the actuation of the rapid traverse motor when the drill is at the bottom of the hole drilled thereby. Accordingly, when the dwell button is closed, the drilled hole will be cleaned by action of the drill before it is withdrawn from the hole.

The switches in the electric control circuit are interlocked to act in prescribed sequence and in response to the requirements of the selected cycle. The interlocked switches are so related to preclude simultaneous transmission of power to the spindle feed means from the rapid traverse motor and the main motor. In the automatic tapping cycle the circuit is interlocked to preclude actuation of the rapid traverse motor in a direction to withdraw the tap from the work.

Other features and advantages of the invention will be more apparent from examination of the following disclosure in which.

Mechanical structure

The drilling machine comprises a base 20 having upright column 21 on which a vertically adjustable work table 22 is mounted. The column is provided with a top head 23 housing the gearing shown in detail in Fig. 5. The column is also provided with an intermediate or drill feed head 24.

Figure 3:
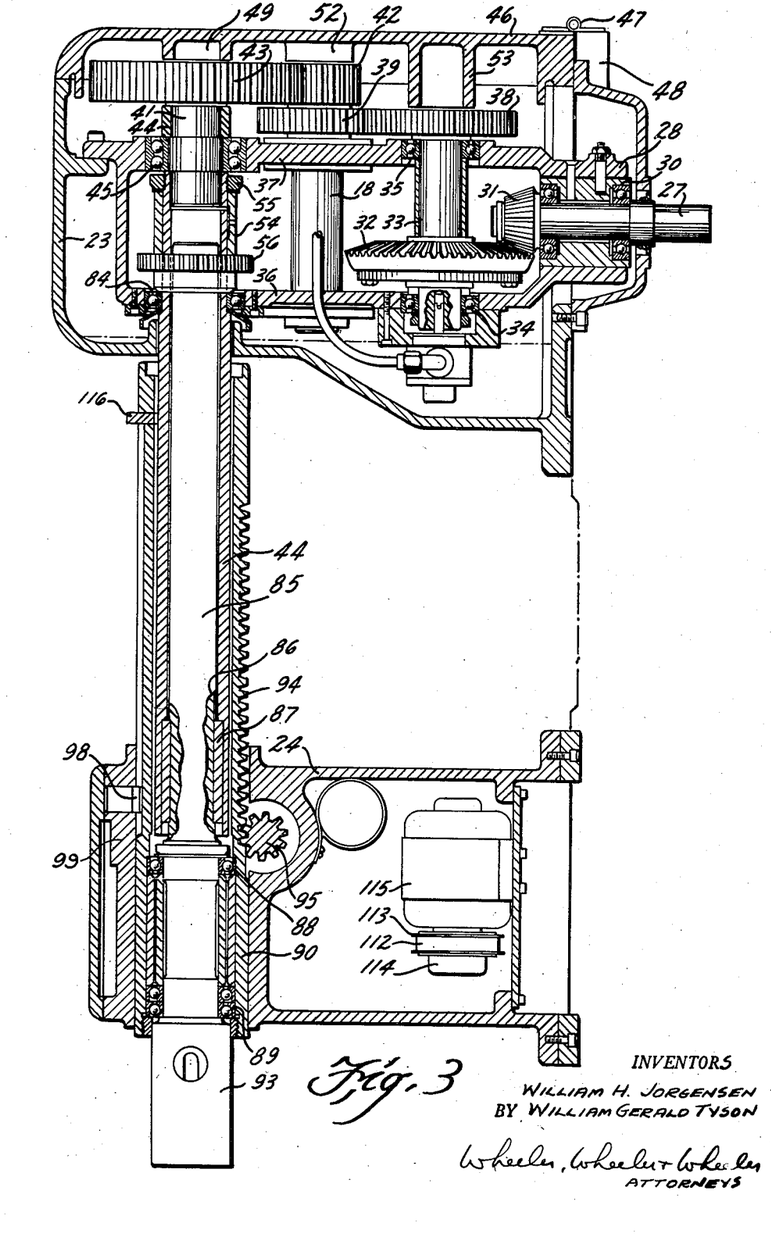
Fig. 3 is a vertical cross section taken along the line 3—3 of Fig. 2.
Figure 4:
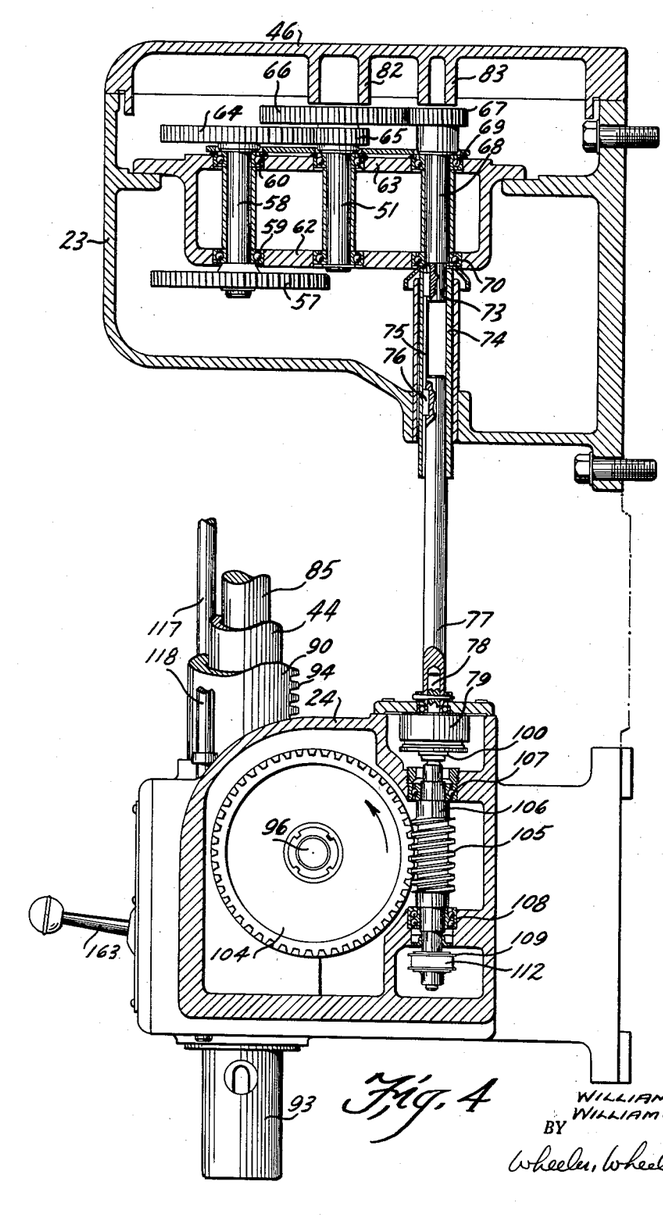
Fig. 4 is a vertical cross section taken along the line 4—4 of Fig. 2.

On shelf 25 mounted at the top rear of column 21 we provide an electric motor 26 having a shaft 27 which drives the gearing inside of top head 23. As best shown in Fig. 3 the shaft is supported by bearings 30 in bearing box 28 and has a bevel pinion 31 mounted at its end. Pinion 31 meshes with bevel gear 32 whose shaft 33 is mounted on bearings 34, 35 respectively seated on lower and upper horizontal shelf partitions 36, 37.

Above the level of horizontal shelf partition 37 the splines 29 of shaft 33 are provided with a pickoff gear 38 which meshes with gear 39 of a pickoff gear set splined at 19 to stub shaft 18 and having another gear 42 which meshes with the pickoff gear 43 splined at 40 to drive lug 41 which is fixedly mounted in the upper end of spindle drive sleeve 44. Drive sleeve 44 is rotatably supported on bearing 45 in partition wall 37 and bearing 84 in partition wall 36.

The top head 23 is provided with a pan-shaped cover 46 pivotally connected by hinge 47 with portion 48 of the pedestal 21 (see Fig. 3). On its under-surface the cover 46 is provided with pickoff gear locating and retaining guide members 49, 52 and 53 which preclude endwise movement of the respective pickoff gears 43, 42 and 38 on their respective splined shafts when the cover is closed.

Figure 5:
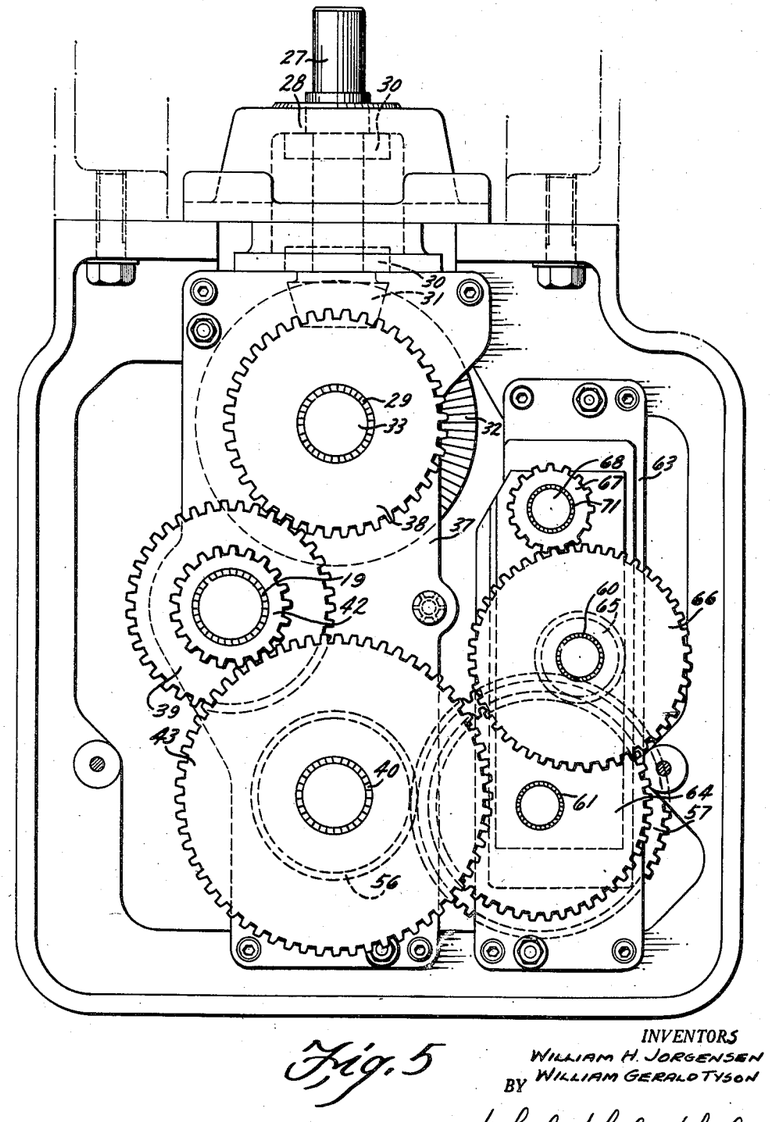
Fig. 5 is a horizontal cross section taken along the line 5—5 of Fig. 2.

Below the level of horizontal partition shelf 37 the drive sleeve 44 is provided with a telescopically related drive stub sleeve 54 connected for rotation therewith by the lock nut 55. Stub drive sleeve 54 is provided with a gear 56 which, as shown in Fig. 5, meshes with gear 57 mounted on the lower end of shaft 58. Shaft 58 rotates on ball bearings 59, 60 respectively seated in lower and upper horizontal partition shelves 62, 63.

At its upper end shaft 58 is provided with a splined connection at 61 to gear 64 which meshes with pinion 65 of a pickoff gear set having a splined connection at 60 with jack shaft 51. The gear set has a large gear 66 meshing with pickoff gear 67 splined at 71 on feed shaft 68. Shaft 68 is rotatably mounted in upper and lower bearings 69, 70 on upper and lower partitions 63, 62.

Feed shaft 68 has an end plug 73 driven into the end of hollow feed shaft 74 provided with a spline 75 engaged with a complementary spline 76 of feed shaft 77 telescopically receivable within hollow feed shaft 74. Feed shaft 77 extends downwardly from the top head 23 to the intermediate or drill feed head 24 and is there connected with the input shaft 78 of electromagnetic clutch 79.

Cover 46 of the top head 23 is also provided with bumpers 82 and 83 which restrain pickoff gears 66, 67 from endwise movement on their splined shafts.

Telescopically and axially movable within drive sleeve 44 is spindle 85. Spindle 85 is provided substantially throughout its entire length with a spline groove 86 which engages the spline tooth 87 disposed at the lower end of the drive sleeve 44. Accordingly, rotative movement of the drive sleeve 44 is transmitted to the spindle through interengaged splines 86, 87, the spindle being adapted for axial movement in the drive sleeve without losing drive contact therewith.

The lower part of the spindle 85 is journaled on upper and lower axial thrust bearings 88, 89 for rotation on the lower end of quill 90 and is shifted axially therewith. The extreme lower end of spindle 85 projects from the drill feed head 24 and is provided with a chuck 93 to receive a conventional drill or tap.

Quill 90 is externally provided with a spline groove 97 (see Fig. 6) which engages a spline tooth 98 mounted on the quill sleeve 99 of the drill feed head 24. Accordingly, the quill is constrained against rotative movement.

The quill is provided with rack teeth 94 with which the pinion 95 on cross feed shaft 96 is engaged. The cross shaft 96 for pinion 95 is supported in bearings 101, 102, 103 (see Fig. 6) and has a worm wheel 104 mounted on the end thereof to receive power from the worm 105 mounted on shaft 106 which is connected to output shaft 100 of the electromagnetic clutch 79. Shaft 106 is supported in bearings 107, 108 seated on partitions of the drill feed head 24. The end of shaft 106 is provided with a pulley 109 for belt 112 which engages the pulley 113 on the armature shaft 114 of rapid traverse motor 115 (see Fig. 3).

In the electrical control circuit for the apparatus disclosed means are provided to selectively energize motor 115 in either direction of rotation at such times as clutch 79 is disengaged. Accordingly, the motor will transmit power through the belt 112, worm and worm wheel, shaft 96 and pinion 95 to rapidly traverse the quill and its spindle up or down. At the appropriate time the control means will de-energize motor 115 to discontinue rapid traverse movement and the clutch 79 may then be engaged to feed the quill and its spindle up or down under power derived through feed shaft 77 and the gearing connecting the feed shaft to the main motor 26.

The use of a rapid traverse motor 115 which is entirely separate and independent from motor 26 is highly desirable in that the range of gear ratios available in the pickoff gears in top head 23 is not great enough to conveniently provide for rapid traverse of the spindle under power of motor 26 and still provide for operation of the quill and spindle at proper slow speeds for feeding the drill against the work.

In the device of the present invention both the main motor 26 and the rapid traverse motor 115 drive the spindle through the same worm and worm gear connections. However, when the rapid traverse motor is energized, clutch 79 is disengaged to permit high speed operation of the worm 105 relieved of the drag of the gearing in top head 23 and isolated from motor 26 which is in constant operation. When clutch 79 is engaged and rapid traverse motor is de-energized the rapid traverse motor will idle but because of its small size compared to the size of motor 26 it does not offer material drag or load to the drive shaft 77.

*Automatic control apparatus*

Detailed description of the operation of the machine will be deferred until the electric circuits are described. However, to familiarize the reader with the general operation of the machine the general control apparatus will be briefly described.

Automatic control of the drilling machine in its various drilling and tapping operations is effected under control of the electric circuits hereinafter described through the operation of limit switches actuated by movement of the quill and according to the setting of control selector switches. Quill 90 is provided along its forward periphery with a transverse plate 116 which moves vertically with the quill. Plate 116 has apertures through which control rods 117, 118 extend.

Figure 1:
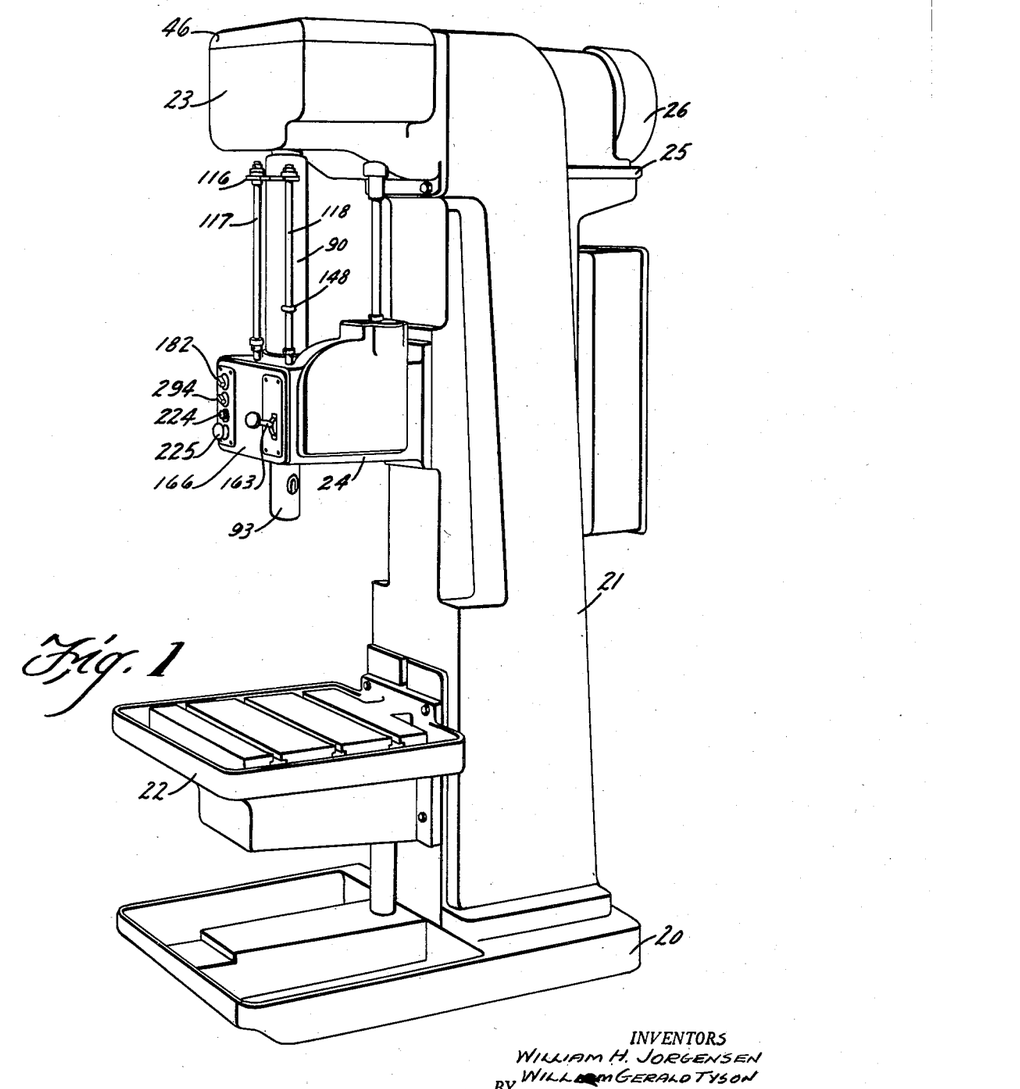
Fig. 1 is a perspective view of an automatic drilling machine embodying one form of our invention.
Figure 2:
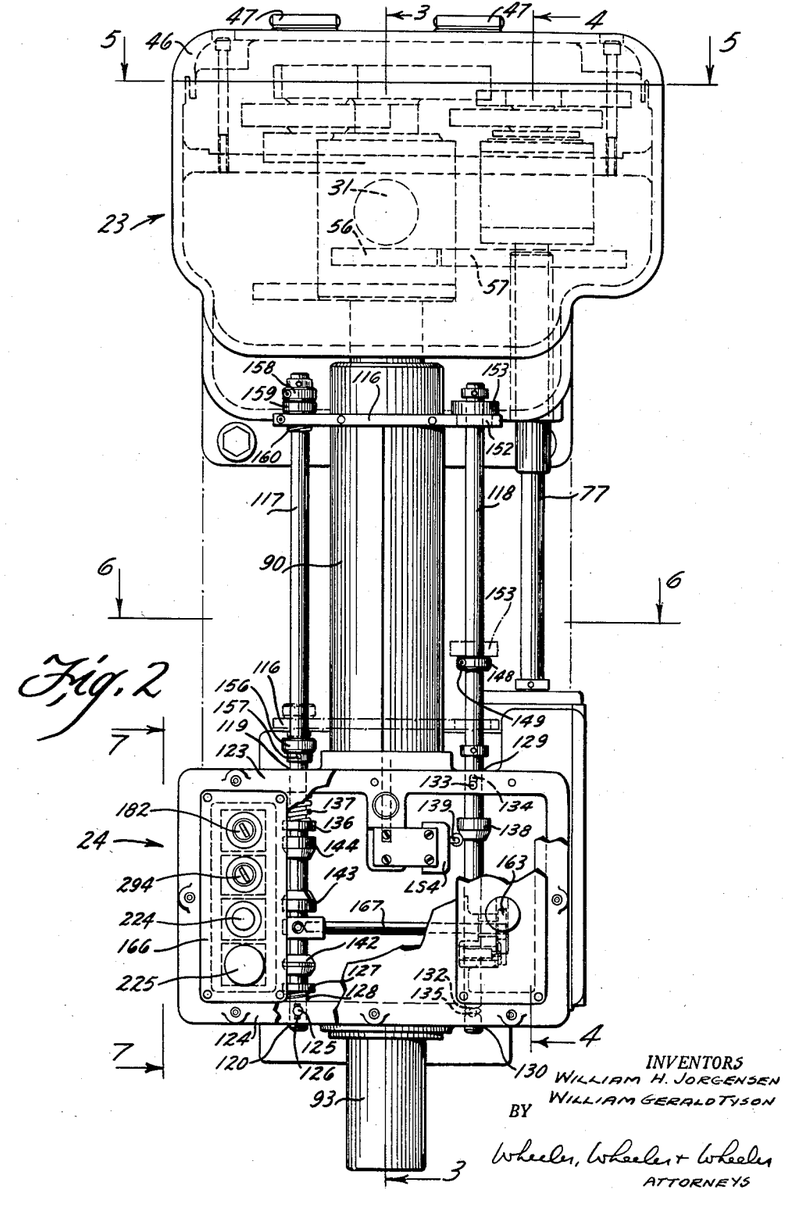
Fig. 2 is a fragmentary front elevation of the machine of Fig. 1, the front panel of the intermediate feed head being broken away to expose details of the control rod actuating mechanism.

Rod 117 is slidably mounted in suitable vertically aligned apertures 119, 120 in the top and bottom walls 123, 124 of the drill feed head 24 (see Fig. 2). Rod 117 is free for limited vertical movement in said apertures and is provided with a vertically elongated slot 126 in which fixed cross pin 125 is disposed. Rod 117 has a collar 127 spaced from wall 124 and a coil spring 128 compressed between the collar 127 and the wall 124 to bias the rod toward its uppermost position.

Rod 117 is also provided with a fixed collar 136 spaced from top wall 123. A coil spring 137 intervenes between collar 136 and the wall 123 and provides a balancing bias against the bias of spring 128, both springs thus tending to center the rod 127 in a "neutral" position.

Rod 118 is similarly mounted for limited vertical reciprocation in vertically aligned openings 129, 130 in top and bottom walls 123, 124 of drill feed head 24. Rod 118 has a vertically elongated slot 134 through which fixed cross pin 133 extends. The bottom end of rod 118 is provided with axially spaced notches 132 and a spring pressed ball detent mechanism 135 selectively engaged with the notches to impositively lock the rod 118 in its upper and lower positions.

Within head 24 rod 118 is provided with a bevel cam 138. The actuating arm 139 of limit switch LS4 is in the path of cam movement.

Figure 7:
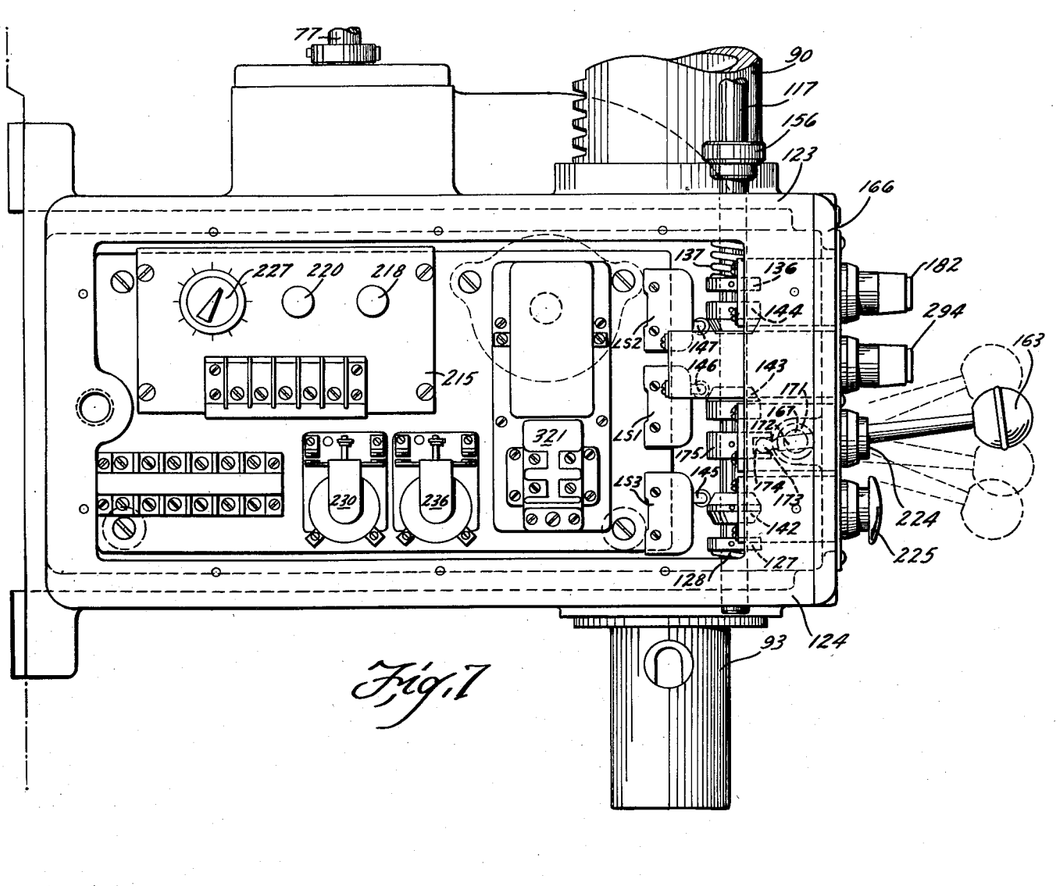
Fig. 7 is an elevation taken along the line 7—7 of Fig. 2, a portion of the side wall of the intermediate head being broken away to expose interior details.

Rod 117 is provided with a double faced bevel cam 142, and axially spaced single bevel cams 143 and 144. The actuating button 145 (see Fig. 7) of limit switch LS3 may be actuated in either direction of axial movement of rod 117 by the respective double faces of bevel cam 142. The actuating arm 146 of limit switch LS1 is in the path of movement of bevel cam 143. The actuating arm 147 of limit switch LS2 is in the path of axial movement of bevel cam 144. The reciprocating movements of the respective control rods 117, 118 and the consequent actuation of the limit switches LS1, LS2, LS3 and LS4 will determine the automatic cycle operation of the machine.

Figure 9:
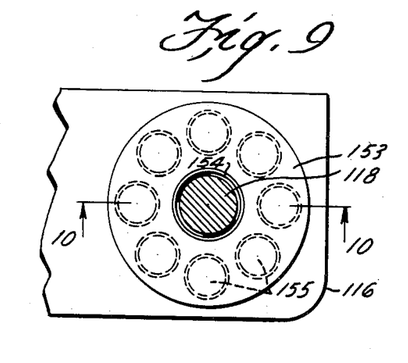
Fig. 9 is a top elevation of a magnet ring used in our control actuator, the spindle quill control arm being shown fragmentarily and the control rod being shown in cross section along the line 9—9 of Fig. 10.
Figure 10:
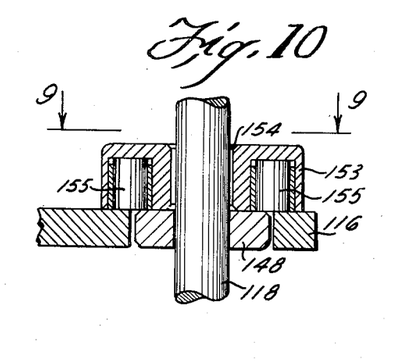
Fig. 10 is a cross sectional view taken along the line 10—10 of Fig. 9.

Rod 118 is provided with a collar 148 (Fig. 2) which may be axially adjusted therealong by means of the set screw 149. Collar 148 is positioned on rod 118 so that the electrical control circuit hereinafter described will cause the spindle to rapidly traverse down until cross plate 116 reaches collar 148. The aperture 152 in cross plate 116 through which rod 118 extends is large enough to completely receive collar 148 therein. On top of the plate 116, however, we provide a magnet ring 153 shown in detail in Figs. 9 and 10.

The magnet ring has a central aperture 154 which fits loosely about rod 118. The magnet ring 153 is provided with an annular series of permanent magnets 155 which, in practice, are made of "Alnico V." These hold the ring to the plate 116 as the spindle descends. When the collar 148 engages the magnet ring 153 under pressure of the descent of plate 116, rod 118 will be shifted downwardly in its bearing apertures 129, 130 to the limit permitted by cross pin 133. In this range of rod movement cam 138 will depress actuating button 139 of limit switch LS4. Further downward movement of the spindle and plate 116 will break the magnetic bond between the magnet ring 153 and plate 116 inasmuch as collar 148 is fixed to rod 118 and the magnet ring will be "lifted" off of the plate 116. The rod 118 will be held in its "down" position by ball detent 135.

In the operation of the machine, actuation of limit switch LS4 de-energizes the rapid traverse motor 115 and energizes the electromagnetic clutch 79. Accordingly, the spindle will feed down beyond the point where limit switch LS4 is actuated.

Rod 117 is provided with a depth collar 156 which is adjustably positioned thereon by means of a set screw 157. When plate 116 engages its collar 156, rod 117 will be shifted axially downwardly against the bias of coil spring 128 and bevel cam 144 will depress actuating button 147 of limit switch LS2. Actuation of limit switch LS2 may cause the spindle to rapid traverse up or reverse lead up, depending on whether the master-selector cycling switch is set for Automatic Drilling or Automatic Tapping. In any event the spindle will move up, the rod 117 remaining "down" by reason of the engagement therewith of spring pressed roller detent 176 hereinafter described.

As the spindle rapid traverses up or leads up plate 116 will engage magnet ring 153, the magnet attraction between the ring and collar 148 being great enough to overcome the resistance offered by spring pressed ball detent 135 and lift rod 118 to the limit permitted by pin 133. This will release cam 138 from actuator button 139 of limit switch LS4 and spring pressed ball detent 135 will engage the upper notch in rod 118. Release of button 139 will reset switch LS4 for the next cycle. If the spindle had been leading up release of button 139 will de-energize electromagnetic clutch 79.

The spindle will continue to move upwardly until plate 116 reaches its uppermost position where upper stop collar 158 on rod 117 is engaged by actuating collar 159 on the plate. Collar 159 has a screw hub 160 adjustably mounting it in a threaded aperture in plate 116. Further upward movement of the plate 116 will lift rod 117 to engage its cam 143 with the actuating arm 146 on limit switch LS1 to actuate switch LS1 to disconnect all drive to the spindle and condition the machine for its next cycle of operation.

Figure 8:
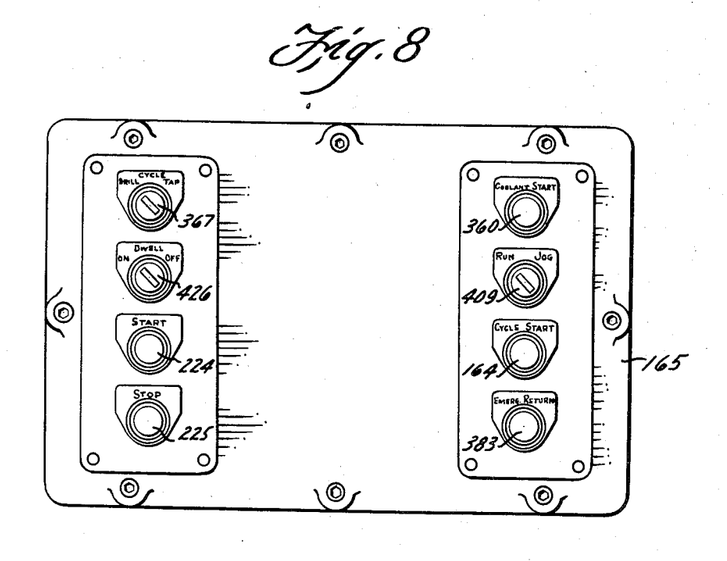
Fig. 8 is an elevation of the control panel of a modified embodiment of the invention.
Figure 11:
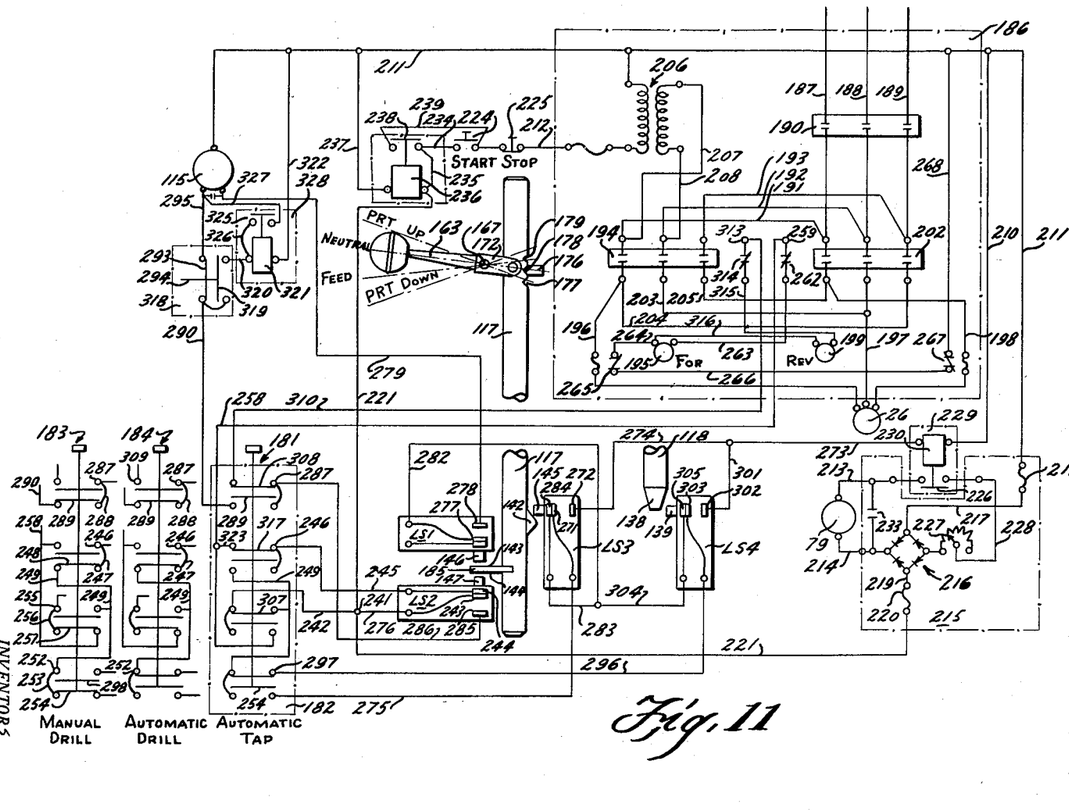
Fig. 11 is a circuit diagram of the embodiment of the invention shown in Figs. 1 through 7.
Figure 12:
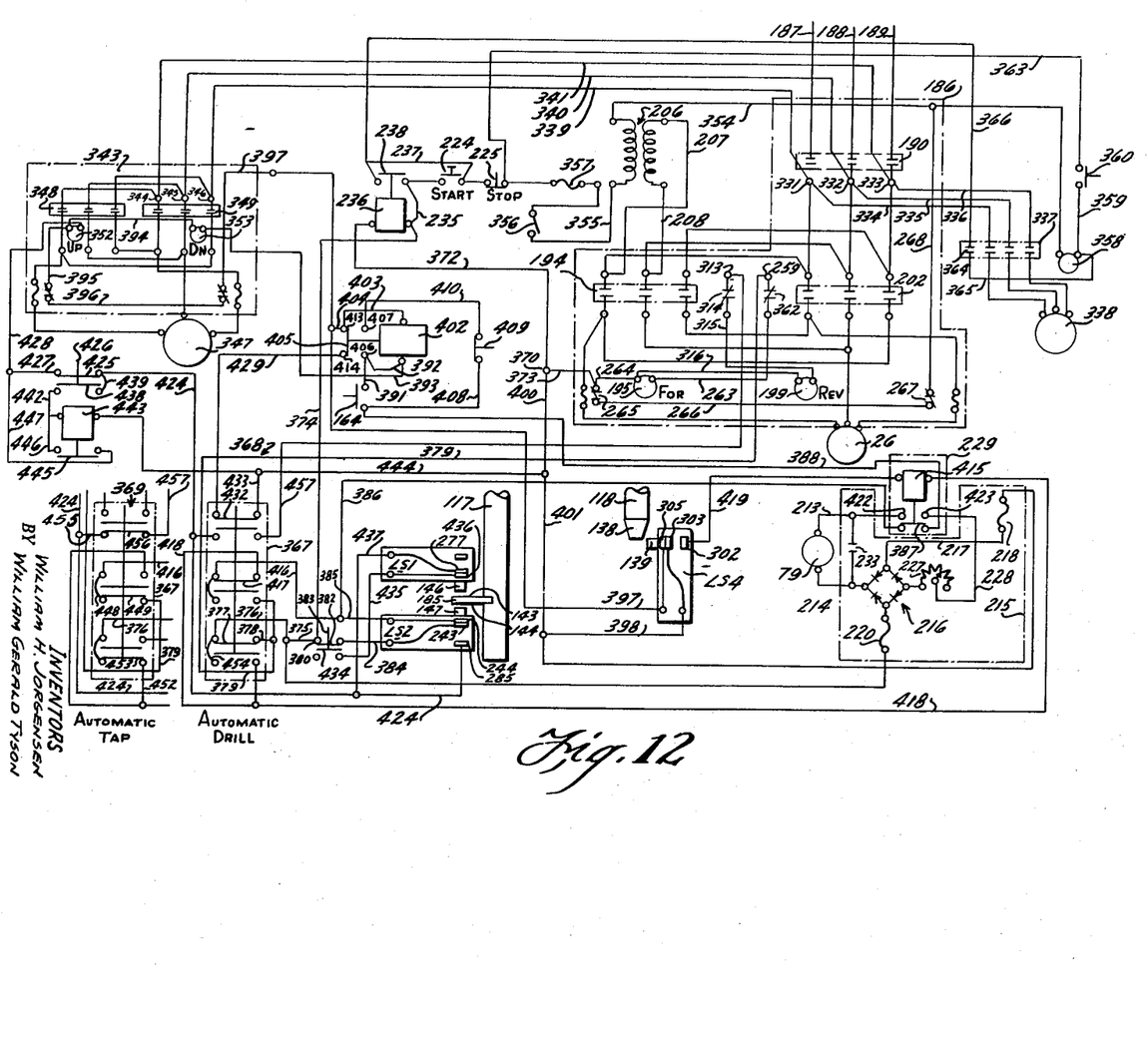
Fig. 12 is a circuit diagram of a modified embodiment of the invention.

There are two principal embodiments of the invention. In one embodiment a hand lever 163 controls the cycling of the machine. This embodiment of the invention is shown in most of the figures of the drawing, and its circuit is shown in Fig. 11. In another embodiment of the invention a push button 164 is substituted for the lever 163. The other parts of the device are essentially the same and are common to both embodiments. The control panel 165 for the second embodiment of the invention is shown in Fig. 8 and its circuit is shown in Fig. 12.

Figure 6:
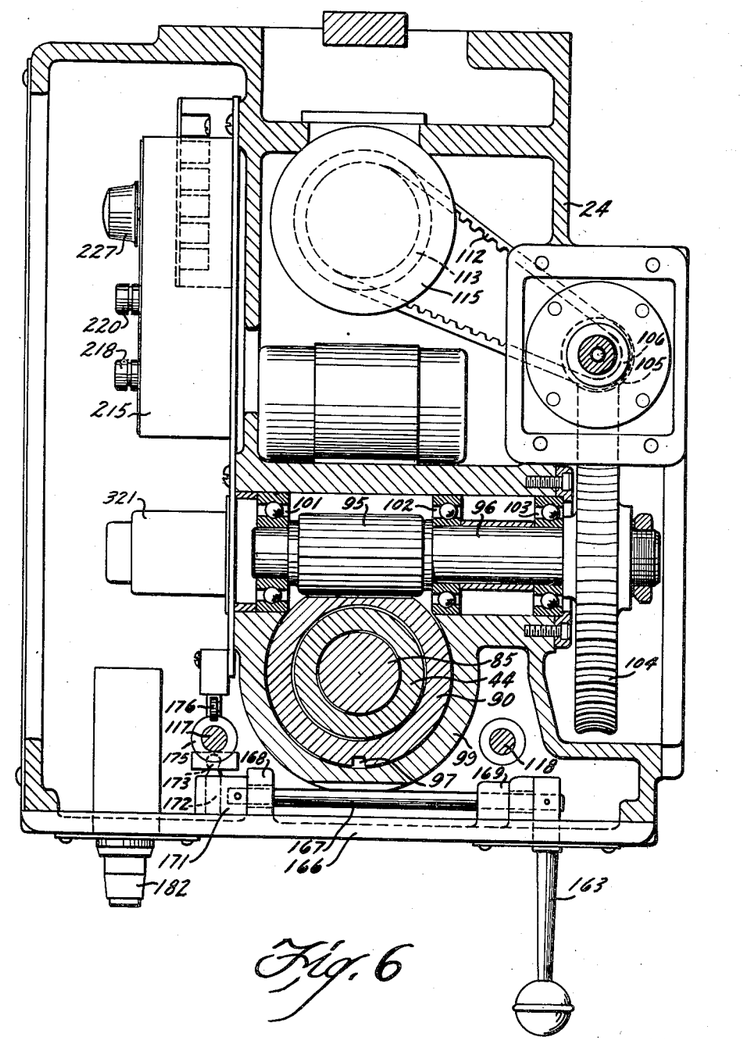
Fig. 6 is a horizontal cross section taken along the line 6—6 of Fig. 2, the top wall of the feed housing being removed to expose interior details.

In the embodiment of the invention using the control lever 163, the lever 163 is mounted on a front panel 166 and is oscillatable on the axis of cross shaft 167 which has bearings on the bearing brackets 168, 169 mounted on the inside face of the panel 166 as best shown in Fig. 6. At its end remote from handle 163, shaft 167 is provided with a cylinder head 171 having a radial crank arm 172 with an end ball 173 engaged in socket 174 of collar 175 fixedly mounted on control rod 117. Handle 163 provides means for manually shifting rod 117, regardless of the position of control plate 116, thus adapting the machine for a manual cycle.

As best shown in Figs. 6 and 11, a spring pressed roller detent 176 engages vertically spaced notches 177, 178, 179 in the rod 117 to impositively bias the rod in its various axial positions. The spring pressed roller detent 176 coacts with the opposed springs 128, 137. In the neutral position of the lever 163 in which it is shown in Fig. 11, the spring pressed roller detent 176 engages notch 178. In the power rapid traverse up position of rod 117 detent 176 engages notch 179. In the feed position of rod 117 detent 176 engages notch 177. There is no notch corresponding to the position of the lever for power rapid traverse down. Accordingly, if the operator releases the handle 163 before plate 116 engages collar 148 on rod 118 in the manual operation of the device, spring 137 will bias the control rod 117 to its feed position.

*Electric circuit for Fig. 11 embodiment*

The single circuit diagram shown in Fig. 11 will be referred to in describing this embodiment of the invention in each of the three several positions of the master selector switch 182. In its connected position shown at 181 master selector switch 182 has its switch blades in position for an automatic tapping cycle. However, at the left of the showing at 181 of the connected selector switch 182, the switch blade positions for a manual drilling cycle are shown at 183 and the switch blade positions for an automatic drilling cycle are shown at 184. As the other connections remain unchanged the description will proceed on the basis of separately describing the operations of the circuit for each position of the master selector switch.

Moreover, in the simplified circuit diagram of Fig. 11, the double faced bevel cam 142 on rod 117 is represented by a simple peripheral cam wedge on the side of the rod. Bevel cam 143 is represented by the top surface of a radial arm 185 extending from rod 117 and bevel cam 144 is represented by the lower surface of arm 185.

The switch gear for the main motor 26 is enclosed in housing 186 and the main power supply consists of three phase input lines 187, 188, 189. A main three phase disconnect switch 190 may be provided to control all power input to the machine. These lines may be connected to motor 26 through branch lines 191, 192, 193 through the three phase switch 194 when the forward relay 195 is energized, or through branch lines 197, 198, 204 when the reverse relay 199 is energized. When forward relay 195 is energized the circuits to motor 26 are completed through switch 194 and fused line 196, line 197 and fused line 198. When reverse relay 199 is energized three phase switch 202 is actuated to reverse the connections from the power lines to the fused input lines 196 and 198. The center terminals on the respective switches 194, 202 are connected by jumper line 203. Fused line 196 is connected from one terminal on switch 194 by jumper 204 to a terminal of opposite polarity on switch 202. Fused line 198 is connected from another terminal on switch 194 by jumper 205 to a terminal of opposite polarity on switch 194.

The control apparatus receives its power from single phase control power transformer 206 having its input lines 207 and 208 respectively connected to main power lines 188 and 189 through branch lines 191 and 192. The secondary terminals of transformer 206 are connected to control power leads 211 and 212.

The electromagnetic clutch 79, shunted by filter condenser 233, receives its power through lines 213, 214 which connect to the bridge rectifier 216 mounted in housing 215. Bridge rectifier 216 has input line 217 connected through fuse 218 to control power line 211. Another rectifier input line 219 is connected through fuse 220 and control power line 221 to control power line 212 through the start-stop switches 224 and 225. Accordingly, after the control circuit has been energized by initially closing start switch 224, rectifier 216 receives input power. The rectified output of rectifier 216 supplies the electromagnetic clutch 79 directly through line 214 and from line 213 through switch 226 and control rheostat 227 in line 228 from the rectifier to the switch 226.

Switch 226 is normally open and is located in a housing 229 which also houses the relay 230 which actuates switch 226 in response to the functioning of the control apparatus as hereinafter described. When relay 230 is actuated, switch 226 is closed to complete a circuit to the electromagnetic clutch 79 through the rectifier aforesaid.

*Fig. 11 circuit for manual drilling cycle*

When used for manual drilling the contact elements of the selector switch 182 are placed in their position shown at 183. The control power circuit is energized and the main motor 26 is connected for forward operation by closing normally open start switch 224. Stop switch 225 is normally closed. Closure of switch 224 completes a holding circuit through holding relay 236 from control power lead 212 through the closed switches 224, 225, lines 234, 235, relay 236 and line 237 to control power lead 211. Holding relay 236 is accordingly energized to close switch 238 which then completes a holding circuit around switch 224 through jumper line 239. Start switch 224 may then be released without breaking the circuit through the holding switch 238.

Completion of the control power circuit aforesaid also energizes the forward starting relay 195 in housing 186 by completing a circuit from control power line 221, cross terminal 241, line 242, terminal 255 in selector switch 182 in its Manual Drill position, through jumper 256, closed switch blade 257 and line 258 to terminal 259 in housing 186. From terminal 259 the circuit continues through normally closed switch 262, line 263 to forward relay 195, line 264, normally closed switch 265, line 266, normally closed switch 267 and line 268 to control power line 211. Closure of forward relay 195 closes the contacts in switch 194 to connect motor 26 to rotate in a forward direction and rotate the spindle at a speed dictated by the particular pickoff gears in place in the top head 23 of the machine. In this connection, it is noted that forward relay 195 is energized through a circuit which does not include any limit switch, the connections being made directly through the selector switch 182. Accordingly, subsequent machine operations will not interfere with continuous spindle rotation in a forward direction.

To power rapid traverse the spindle to a point where the tool nearly engages the work the operator will move handle 163 to its Fig. 11 position marked "Prt-down." Control rod 117 is accordingly lifted and bevel cam 142 will pass over the actuating button 145 of limit switch LS3. Contact 271 in limit switch LS3 thus momentarily engages contact 272 to momentarily complete a circuit from control power line 211 through line 210, relay coil 230, lines 273 and 274 through closed contacts 272, 271 in LS3, line 275, closed selector switch blade 254, jumper 253, terminal 252, line 249, closed selector switch blade 248, jumper 247, terminal 246, line 245 through the normally closed contacts 243, 244 of limit switch LS2 and line 276 to terminal 241 of control power line 221. Accordingly, the relay switch 226 in housing 229 will momentarily close to momentarily energize clutch 79. However, as the throw of rod 117 in its movement to "Prt-Down" position is greater than the spacing between cam 142 and button 145, the button will be released and limit switch LS3 contact 271 will break away from contact 272 to break the circuit aforesaid and electromagnetic clutch 79 will be de-energized.

When lever 163 reaches its "Prt-Down" position bevel cam 143 will depress actuating button 146 of limit switch LS1 to close its contacts 277 and 278 to complete a circuit to power rapid traverse motor 115 from control power line 211, through motor 115, down line 279, closed contacts 277, 278 in LS1, line 282, line 283 through normally closed contacts 271, 284 in limit switch LS3, line 275 through the selector switch blade 254, jumper 253, terminal 252, line 249, closed selector switch blade 248, jumper 247, terminal 246, line 245, the normally closed contacts 243, 244 of limit switch LS3 and lines 276 to terminal 241 of control power line 221.

The power rapid traverse motor 115 is thus energized to drive the spindle rapidly downwardly toward engagement of the drill with the work. In the manual operation of the device the operator will manually release lever 163 when the drill nears the work. Bias spring 137 then shifts the rod 117 downwardly until the lever 163 is in its Fig. 11 "Feed" position and the spring pressed roller detent 176 engages notch 177 in the rod to impositively hold the rod in this position.

The foregoing movement of rod 117 disengages cam 143 from actuator arm 146 of limit switch LS1 to open the circuit to the rapid traverse motor 115. Moreover, in its feed position cam 142 engages actuator button 145 of limit switch LS3 to open contacts 284, 271 and close contacts 271, 272 therein. This further breaks the circuit to the rapid traverse motor 115 and completes a circuit through the relay 230 in housing 229 as aforesaid to close switch 226 and energize the electromagnetic clutch 79. With the clutch 79 engaged and the power rapid traverse motor 115 de-energized, the spindle will be driven through the clutch 79 from the gearing in the top head 23 of the machine at preselected drill feeding speed.

When the drilling operation is completed the operator may lift control lever 163 to its "Neutral" position to further shift rod 117 downwardly and release actuator button 145 of limit switch LS3, thus breaking the circuit to the electromagnetic clutch 79. It is also possible to pre-adjust depth stop collar 156 on rod 117 (see Fig. 2) so that when control plate 116 engages collar 156 it will shift the rod 117 downwardly for the same purpose and at the same time mechanically restore lever 163 to its "Neutral" position. The operator may now raise lever 163 to its "Prt-Up" position. This will still further shift rod 117 downwardly to engage cam 144 with actuating button 147 of limit switch LS2 and close contacts 243 and 285 thereof. This completes a circuit to energize the power rapid traverse motor 115 in reverse through control power line 221, terminal 241, line 276, closed contacts 243, 285 of LS2, line 286, selector switch terminal 287, jumper 288, closed selector switch blade 289, line 290 through the normally closed switch blade 293 of dwell selector switch 294 and line 295 through motor 115 to control power line 211. The motor then operates in reverse to rapid traverse the spindle upwardly until the operator restores lever 163 to its neutral position or until control plate 116 strikes upper stop collar 158 to lift rod 117 and disengage contacts 243, 285 of limit switch LS2 to break the circuit aforesaid.

The operation of the machine as just described in its manual drill cycle does not require control rod 118, limit switch LS4, magnet ring 153, etc. The operation is basically a manual one in which the operator manipulates control lever 163. However, even in the manual operation the power rapid traverse motor 115 is actuated and the interlocking switches LS1, LS2 and LS3 assure that the electromagnetic clutch 79 is de-energized at such times as the rapid traverse motor 115 is energized.

*Fig. 11 circuit for automatic drilling cycle*

For completely automatic drilling, the selector switch 182 is placed in its position shown at 184 in which the line 275 to the movable contact 271 of the limit switch LS3 is cut out and line 296 from terminal 297 of the selector switch extending to the movable contact 303 of limit switch LS4 is connected by means of closed selector switch blade 298 to line 249. Accordingly, the only way that electromagnetic clutch 79 can be energized is through LS4.

The machine is placed in power rapid traverse down by moving control lever 163 to its lowermost "Prt-Down"

position as aforestated. The power rapid traverse motor 115 is energized as aforesaid except that the circuit is not completed through limit switch LS3, whose line 275 is open circuited because selector switch blade 254 is open in the Automatic Drilling position thereof. The circuit is from control power line 211, through motor 115, line 279, closed contacts 278, 277 in LS1, line 282, line 304, normally closed contacts 303, 305 in limit switch LS4, line 296, selector switch terminal 297, closed selector switch blade 298, terminal 252, line 249, closed selector switch blade 248, jumper 247, terminal 246, line 245, closed contacts 243, 244 in LS2 and line 276 to terminal 241 of control power line 221. Accordingly, the spindle rapid traverses down until the magnet ring 153 on control plate 116 engages the feed collar 148 on control rod 118.

The attraction of the magnet to the feed plate 116 transmits downward thrust to the rod 118 to engage bevel cam 138 of rod 118 against the actuating button 139 of limit switch LS4. This opens contacts 303, 305 therein to open the circuit to the motor 115, and closes contacts 302, 303 therein to complete the electromagnetic clutch circuit from control power line 211, line 210, relay 230 in housing 229, lines 273 and 301, closed contacts 302 and 303 of limit switch LS4, line 296, selector switch terminal 297, closed selector switch blade 298, terminal 252, line 249, closed switch blade 248, jumper 247, terminal 246, line 245 through the normally closed contacts 243, 244 of limit switch LS2 and line 276 to control power terminal 241. Thus relay 230 is energized to close switch 226 to energize the electromagnetic clutch 79 to place the spindle in feed.

As shown in Fig. 2 magnet ring 153 is lifted off of plate 116 in the course of continued downward movement of the spindle and is supported on collar 148. The spindle will be driven at drill feeding speed through electromagnetic clutch 79 until control plate 116 engages the lower depth collar 156 on control rod 117. Accordingly, the control rod 117 is shifted downwardly until bevel cam 144 engages the actuating button 147 on limit switch LS2 to open contacts 243, 244 in LS2, thus breaking the circuit aforesaid to the relay coil 230 and opening switch 226 in the supply circuit to the electromagnetic clutch. The spindle will then stop feeding, although it will continue to rotate. Actuation of button 147 of limit switch LS2 will also close contacts 243, 285 thereof to complete a circuit to the reverse terminal of the power rapid traverse motor 115. This circuit is from control power terminal 241, line 276, closed contacts 243, 285 in limit switch LS2, line 286, selector switch terminal 287, jumper 288, closed selector switch blade 289 and line 290 through the normally closed switch blade 293 of dwell selector switch 294 and line 295 through the motor 115 to control power line 211. The spindle will then rapid traverse up.

As control plate 116 rises and passes control collar 148 magnet ring 153 is re-engaged by the plate and the magnetic attraction between the ring and collar 148 is sufficient to lift rod 118 until pin 133 engages the end of slot 134, thereby lifting cam 138 off of actuator button 139 on LS4 to re-set limit switch LS4. Continued movement of the control plate 116 breaks the magnet ring 153 away from control collar 148. When the spindle reaches its extreme upward position plate 116 engages its collar 159 against upper stop collar 158 to lift control rod 117 into its neutral position, thereby releasing bevel cam 144 from actuating button 147 of limit switch LS2 and conditioning the apparatus for the next automatic drilling cycle which the operator initiates simply by moving control lever 163 into its "Prt-Down" position.

*Fig. 11 circuit for automatic tapping cycle*

For automatic tapping, the circuit must be such that the tapping tool will reverse at the end of the tapping operation to lead the tap out of the threaded tap hole. For this purpose the master selector switch 182 is placed in its Automatic Tap position shown connected into the circuit at 181.

Unlike the circuits used for manual and automatic drilling, in which forward relay 195 is connected independently of any circuits through any limit switch, forward relay 195 is energized through a circuit which includes LS2 so that forward rotation of the tap is discontinued after the thread is completed. The reverse relay 199 is likewise energized by a circuit which includes LS2 so that the spindle then automatically reverses its direction of rotation to lead the tap out of the threaded tap hole. The selector switch is interlocked to positively preclude actuation of the rapid traverse motor in its reverse (up) direction when the selector switch is set for "Automatic Tapping." Otherwise the tap might be subject to breakage and the thread walls of the tapped hole damaged.

Main motor 26 is energized by closing start switch 224 to complete a circuit from control power terminal 241, normally closed contacts 243, 244 of limit switch LS2, line 245, selector switch terminal 246, closed selector switch blade 317, line 323, line 258 to terminal 259 in housing 186. The circuit through the forward relay 195 is then completed as hereinbefore described.

Lever 163 is then moved to its "Prt-Down" position whereupon the circuit to the power rapid traverse motor 115 will be completed through LS1 and LS4 as in the case of the automatic drilling cycle. Spindle will rapid traverse down until collar 148 on rod 118 is engaged by the magnet ring 153 to cause closure of limit switch LS4 to energize the electromagnetic clutch 79 and de-energize the power rapid traverse motor 115 as aforesaid. The tap will then "lead" down into the work until bottom depth collar 156 on control rod 117 is engaged by the control plate 116.

In the setting of the selector switch 182 for Automatic Tapping the circuit through LS4 which energizes relay coil 230 for actuating clutch 79 is completed from movable contact 303 in LS4 through line 296, closed selector switch blade 298, terminal 252, line 249, closed selector switch blade 307, terminal 255 and line 242 directly to control power line terminal 241 to complete the circuit without going through switch LS2 as was the case when the selector switch 182 was set in its Automatic Drilling position. Accordingly, when actuating button 147 of LS2 is engaged by cam 144 on rod 117 the circuit which maintains the electric clutch energized is not broken.

The only effect of actuation of limit switch LS2 is to engage its contacts 243, 285 to complete a circuit from control power line terminal 241 through line 276, closed contacts 243, 285 of the limit switch LS2, line 286, terminal 287, closed selector switch blade 308, terminal 309 and line 310 to terminal 313 in housing 186. This circuit continues through normally closed switch 314, line 315, the motor reversing relay coil 199, jumper line 316, line 264, fuse 265, line 266, fuse 267, and line 268 to control power line 211. At the same time, forward relay 195 in housing 186, which had been energized as aforesaid through a circuit through normally closed contacts 243, 244 of limit switch LS2 is de-energized because of the actuation of the limit switch to open contacts 243, 244. Accordingly, forward relay 195 is de-energized and reverse relay 199 is energized to close reversing switch 202 and open forward switch 194 to operate the main motor 26 in reverse.

The spindle then reverses its direction of rotation and the tap will lead out of the tapped hole. The spindle will lead up until magnet ring 153 on control plate 116 lifts control rod 118 to de-actuate limit switch LS4, thus breaking the circuit to relay 230 and de-energize electromagnetic clutch 79. The spindle will then be turning in reverse but not leading up or down. The control handle will be in its "Prt-Up" position because rod 117 was held was held in its down position to which it had been shifted by the prior engagement of control plate 116 with depth collar 156 and held in that position by the engagement of the spring pressed roller detent 176 with notch 179 of the rod.

With the selector switch 182 in its Automatic Tap position, the spindle cannot be rapid traversed upwardly inasmuch as selector switch blade 289 in circuit with the up terminal of the motor is open. If it is desired to rapid traverse the tool upwardly to clear the work table space for reception of a larger workpiece, the control rod 118 may be manually depressed to reclose contacts 302, 303 in LS4 to lead the spindle up, or the selector switch may be shifted to either its manual or automatic drilling position which will then close switch blade 289 and complete the circuit through the closed contacts 243, 285 of limit switch LS2.

However, if it is not necessary to rapid traverse the tool upwardly and if additional tap holes are to be made in succeeding workpieces of similar size, the selector switch 182 may be left in its Automatic Tap position and lever 163 shifted to its Prt-Down position. This will raise control lever 117 to shift contact 243 in limit switch LS3 from engagement with the contact 285 to engagement with contact 244 to break the circuit to reverse relay 199 in housing 186 and make the circuit to the forward relay 195 whereby the appropriate switches will be actuated and main motor 26 will run forwardly. Moreover, the down circuit of the rapid traverse motor 115 will be completed in the manner aforesaid by engaging contacts 277, 278 in limit switch LS1. The spindle will then rapid traverse down until magnet ring engages collar 148 on control rod 118 to place the spindle in lead and the cycle will repeat as aforedescribed.

*Fig. 11 dwell selector switch*

In the manual and automatic drilling cycles of the machine, it is usually desirable to permit the drill to make a few additional revolutions at the bottom of the hole with the feed disengaged. Thus the bottom of the hole is cleaned and smoothed before the spindle is rapid traversed up. This can be accomplished in the manual drill cycle if the operator simply waits for a few moments when the drill is at the bottom of the hole and feed clutch is disengaged before shifting lever 163 to its "Prt-Up" position.

When dwell at the bottom of the hole is desired in the Automatic Drill position of the selector switch, dwell selector switch blade 319 in housing 318 is closed by actuating dwell selector switch button 294. This opens the direct switch blade 293 and closes switch blade 319 which is connected by line 320 through timing relay 321 and line 322 to control power line 211. Timing relay 321 is arranged to provide a few moments delay between the time it is energized and the time that it closes switch blade 325 to complete a circuit to motor 115 through jumper 326, switch blade 325 and line 237. Accordingly, the drill will make several revolutions at the bottom of the hole after feed is disconnected by the parting of contacts 243, 244 in limit switch LS2 before switch 325 in the dwell timing relay housing 328 is closed to energize motor 115 in its rapid traverse up movement.

With the selector switch 182 in automatic tap position, however, line 290 to the rapid traverse motor is disconnected by reason of the opening of switch blade 289 in the selector switch. Accordingly, the rapid traverse up circuit is open so that it is impossible to rotate the tap in the hole in a dwell operation.

*Electric circuit for Fig. 12 push button embodiment*

The circuit diagram of Fig. 12 discloses the embodiment of the invention in which push button 164 replaces the lever 163 of the embodiment of the invention shown in the circuit diagram of Fig. 11. The Fig. 12 embodiment is adapted for both automatic drilling and automatic tapping cycles, but does not have any provision for manual operation. The circuit shown in Fig. 12 is more completely automatic than the circuit of Fig. 11 in that human intervention (by manipulating handle 163) is never called for nor required.

Many parts and circuit components are the same as shown in Fig. 11 and have been given the same reference characters. The rectifier circuit for supplying direct current to the electromagnetic clutch 79 is substantially the same as previously described and will not be re-described.

The switching arrangement for supplying the main motor 26 with three phase electric current is also the same as in the prior embodiment and will not be re-described, except to note that three phase input lines 187, 188, 189 are provided with additional terminals 331, 332, 333 for three phase lines 334, 335 and 336 which lead to three phase switch 337. Switch 337 controls the flow of current to the three phase coolant pump motor 338. Terminals 331, 332 and 333 also connect to additional branch three phase lines 339, 340 and 341 for supplying three phase electric current to terminals 344, 345 and 346 on housing 343. These terminals supply power to the three phase power rapid traverse motor 347 through reversing switches 348 and 349.

The ganged contacts in switch 348 are actuated by the rapid traverse motor up relay 352 and the ganged contacts in switch 349 are actuated by the rapid traverse down relay 353. The several connections from the switches to the motor 347 are similar to the connections in housing 186 in Fig. 11. As they are clearly shown in the drawing they will not be specifically described.

As in the embodiment of the invention shown in Fig. 11, lines 207, 208 supply single phase electric current to the control circuit transformer 206 which has output leads 354 and 355. Lead 355 is connected through switch 356 and fuse 357 to normally closed stop switch 225. As in the prior embodiment, I also provide a normally open start switch 224 having the same connections through appropriate lines to the holding relay 236, the description for the operation of the relay being the same as in the previously described embodiment, except that the holding relay circuit is completed through lines 372, control power terminal 370, line 373, normally closed contact 265 in housing 186, line 266, normally closed contact 267 and line 268 to transformer lead 354.

The electric actuating circuit to the coolant motor 338 includes relay 358. One terminal of the relay is connected by line 359, normally open coolant motor switch 360 and line 363 to transformer output line 355 through fuse 357 and switch 356. The other terminal of the relay 358 is connected directly to output lead 354 of the transformer. However, as soon as relay coil 358 operates to close the switch 337, a holding circuit for the relay is closed through contacts 364 in switch 337. Contacts 364 are connected to one side of the relay 358 through line 365; the contacts are also connected through line 366 and line 239 through stop switch 225, fuse 357 and switch 356 to transformer output lead 355. Accordingly, switch 360 can be released to its normally open position and the coil 358 will remain energized through the holding circuit aforesaid. Since stop switch 225 is in the holding circuit aforesaid, actuation of stop switch 225 to stop the machine will break the holding circuit and de-energize coolant motor 338.

The circuit of the Fig. 12 embodiment is provided with master selector switch 367 having two positions of use, one for the Automatic Drilling cycle shown connected at 368 and one for the Automatic Tapping cycle shown separately at 396. In this embodiment there is no Manual Drilling cycle. The automatic drilling cycle will now be described.

*Fig. 12 automatic drilling cycle*

As in the Fig. 11 embodiment, the main motor 26 is energized in forward direction by closing start switch 224 which actuates the holding coil 236 as aforesaid. Accordingly, control current will flow from output line 355 of the transformer through the switch arrangement and through control power line 374 to control power line terminal 380. From terminal 380 the circuit is completed through line 375, line 376 through closed selector switch blade 377, line 378, line 379 to the terminal 259 for forward relay 195 in housing 186. The circuit is then completed through the relay 195 as hereinbefore described. Motor 26 now rotates the spindle in its forward direction.

To place the spindle in rapid traverse down, normally open switch 164 is closed. This completes a circuit from control power terminal 380 through normally closed switch blade 382 of the emergency return push button 383, line 384, the normally closed contacts 243, 244 of limit switch LS2, line 385, line 386, normally closed switch blade 387 in housing 229, line 388, closed switch 164, lines 391, 392 and 393 through rapid traverse down relay coil 253 in housing 343 and return lines 394, 395, 396, 397 through normally closed contacts 305, 303 of limit switch LS4, line 398, and lines 401, 400 to control power terminal 370. This completes the rapid traverse down circuit.

When button 164 is closed, moreover, a holding circuit is established from line 392 through the holding relay 402, line 403 and line 404 to line 397 and through the limit switch LS4, lines 398, 401, 400 to control power terminal 370 to draw switch blade 405 to bridge contacts 406, 407. This completes a holding circuit around switch 164 through line 408, normally closed jog-run selector switch 409, line 410, terminal 407, closed switch 405, terminal 406, line 392, the holding coil 402, line 403, etc. Even though switch 164 is then released, the holding coil continues to receive power through the circuit including the jog-run selector switch 409 to keep switch blade 405 bridging terminals 406, 407. The circuit to the rapid traverse down relay 353 then bypasses switch 164 through line 408, switch 409, line 410, switch blade 405, bridging terminals 406, 407 and line 392 to line 393. Both the holding circuit for coil 402 and the circuit to the rapid traverse down relay 353 include line 397, the circuit for which is completed through the normally closed contacts 303, 305 of limit switch LS4.

When the spindle has rapid traversed down to the point where plate 116 and magnet 153 thereon engage the collar 148 on control rod 118, the control rod 118 is shifted downwardly to engage its cam 138 with the actuating button 139 on limit switch LS4 to break the connection between contacts 303, 305 aforesaid, thus breaking the circuit aforesaid through the rapid traverse down relay 353 and de-energizing the rapid traverse motor 347. The breaking of this circuit through LS4 concurrently de-energizes holding coil 402. Accordingly, switch blade 405 returns to its position shown in the drawing in which it bridges between the terminals 413 and 414.

Actuation of arm 139 on limit switch LS4 by reason of the descent of control rod 118 also closes contacts 303, 302 of LS4 to energize the relay coil 415 in housing 229. The control power circuit to coil 415 is from control power terminal 380, normally closed switch blade 382, line 384, normally closed contacts 243, 244 of limit switch LS2, line 385, line 416, closed selector switch blade 417, line 418, through relay coil 415, line 419, closed contacts 302, 303 in limit switch LS4, line 398, line 401, line 400 to control power terminal 370. When coil 415 is energized as aforesaid, switch blade 387 bridges across terminals 422, 423 to complete a circuit from rectifier 216 through lines 228, 213 and 214 to the electromagnetic clutch 79 to place the spindle in feed.

In this connection it is noted that actuation of the coil 415 further breaks the circuit to the rapid traverse motor inasmuch as the switch blade 387 breaks the connection between lines 388 and 386.

The spindle will now feed down until control plate 116 engages collar 156 on control rod 117 to engage cam 144 against the actuating button 147 of limit switch LS2. Thus contacts 243 and 244 in limit switch LS2 are separated and the circuit including these contacts which maintained coil 415 and electromagnetic clutch 79 energized is broken and the spindle discontinues feeding, although it continues to rotate. Accordingly, switch blade 387 will return to its position shown in the diagram in which it re-connects lines 386, 388 in the rapid traverse control circuit, although the circuit is still open by reason of the separation of contacts 303, 305 in limit switch LS4 and the breaking of the holding circuit through holding relay 402.

Actuation of button 147 of limit switch LS2 also closes contacts 243, 285 therein to complete a circuit to the rapid traverse up relay 352 from control power terminal 380 through closed switch blade 382, line 384, closed contacts 243, 285 of limit switch LS2, line 424, closed switch blade 425 of the dwell switch button 426, line 427, line 428, rapid traverse up relay 352, line 395, line 396, line 397, line 404, switch blade 405 which now bridges terminals 413, 414 in consequence of the prior breaking of the circuit through holding coil 402, line 429, closed selector switch blade 432, line 433, line 444 and line 400 to control power terminal 370. The spindle is now in rapid traverse up and the rapid traverse motor 347 will continue to be energized until contact plate 116 engages upper stop collar 158 to lift rod 117, thereby releasing cam 144 from engagement with actuating button 147 of limit switch LS2 and open contacts 243, 285. The apparatus is now in condition for another automatic drilling cycle which is initiated by the operator pressing button 164.

Run-jog selector switch

The run-jog selector switch 409 is normally closed and holding coil 402 is normally energized through switch 409 once cycle start switch 164 has been closed momentarily to initially energize the coil 402 to draw switch blade 405 into bridging engagement with contacts 406, 407. Thereafter switch 164 can be opened and the circuit through holding coil will remain closed. Under these conditions the rapid traverse motor will "run" until the contact button 139 of limit switch LS4 is engaged by the bevel cam 138 on control rod 118. If it is desired to "jog" the spindle into position, selector switch 409 is opened. Accordingly, holding coil 402 will be de-energized as soon as pressure on cycle start switch 164 is released and the rapid traverse down relay 353 will be de-energized. Accordingly, switch 164 will have to be repeatedly re-closed to re-energize power rapid traverse down relay 353 for each "jog."

Emergency return circuit

Emergency return push button 383 may be actuated any time in the event of an emergency to actuate the rapid traverse up relay 352. Switch blade 382 is thus disconnected from terminal 383. Since both rapid traverse down and drill feed circuits include switch blade 382, actuation of push button 383 will break these circuits. Switch blade 434 will concurrently make connection between control power terminal 380, line 435, normally closed contacts 277 and 436 in limit switch LS1, line 437, line 424 to rapid traverse up relay 352 in the manner aforesaid.

When control plate 116 engages upper stop collar 168 on rod 117, the rod will be lifted to engage bevel cam 143 with the actuator button 146 on limit switch LS1 to disengage switch contacts 277, 436 and thereby break the foregoing circuit to the rapid traverse up relay coil. The emergency button 383 may then be released to condition the apparatus for another automatic drilling cycle.

Dwell

As in the Fig. 11 embodiment of the invention we may introduce into the circuit for the rapid traverse up relay a time delay to produce dwell between the end of the down feed cycle and the rapid traverse up cycle. The dwell button 426 is provided with a switch blade 438 which may be connected by means of jumper 439 and line 442 through the timing relay 443, line 444 and line 400 to control power terminal 370. After a predetermined time delay coil 443 will close switch 445 to complete the circuit through lines 446, 447 and 428 to the rapid traverse up relay 352.

*Fig. 12 automatic tapping cycle*

In the automatic tapping cycle of the Fig. 12 embodiment of the invention, the master selector switch 367 is placed in its Automatic Tap position shown at 369. The main motor 26 is energized by closing the start button 224 in the manner aforesaid to complete a circuit from control power output lead 355 of output transformer 206 through the start switch, control power line 374, control power terminal 380, switch blade 382 of emergency return switch 383, line 384, normally closed contacts 243, 244 of limit switch LS2, lines 385 and 416, jumper 448, closed selector switch blade 449, line 379 to forward motor relay terminal 259 in housing 186.

The spindle may be rapid traversed down by closing push button switch 164 which completes a circuit to the rapid traverse down relay 253 and which concurrently closes a circuit through the holding relay 402 through the normally closed contacts 303, 305 of limit switch LS4 in the manner aforesaid. The spindle will then rapid traverse down until control plate 116 and magnet 153 engage collar 148 on control rod 118. When the control rod 118 is shifted axially to engage cam 138 against actuating button 139 on limit switch LS4, control contacts 303, 305 in limit switch LS4 are separated to break the circuit aforesaid to the rapid traverse down relay 353. Actuator button 139 also closes contacts 302, 303 in limit switch LS4 to complete a circuit through relay 415 to cause switch blade 387 to bridge across contacts 422, 423 and energize clutch 79 to place the spindle in lead in a downward direction. The circuit through coil 415 is completed through line 418, line 452, closed selector switch blade 453, jumper 454, line 367 and 375 to control power terminal 380. Accordingly, in the Fig. 12 embodiment the control circuit for the electromagnetic clutch 79 is completed independently of the contacts in limit switch LS2.

The spindle will lead down until plate 116 engages depth collar 156 on control rod 117, thereby shifting rod 117 downwardly to engage bevel cam 144 with the button actuator 147 on limit switch LS2. This separates contacts 243, 244 in limit switch LS2 to break the circuit to forward relay 195 in the main motor control circuit. The contacts 243, 285 in limit switch LS2 will then be closed to complete a circuit to the reverse relay 199 for the main motor 26 to cause the spindle to lead up. The circuit to reverse relay 199 is completed from control power terminal 380, normally closed blade 382 of emergency return switch 383, line 384, closed contacts 243, 285 of limit switch LS2, line 424, line 455, closed selector switch blade 456, line 457, and reverse relay terminal 313 in housing 186.

The spindle will then reverse rotation and the spindle feed transmitted through clutch 79 will also reverse to lead the spindle up until magnet 153 lifts control rod 118 upwardly to release actuating button 139 on limit switch LS4. Contacts 302, 303 in limit switch LS4 will be thereby opened to disengage clutch 79 and discontinue upward leading of the spindle. Another workpiece may then be inserted into the machine and the rapid traverse down button 164 depressed to start the next cycle. If it is desired to raise the spindle to admit a larger workpiece, the emergency return button 383 may be depressed to close switch blade 434, thus completing the circuit aforesaid through the rapid traverse up relay 352.

We claim:
1. An automatic drilling machine comprising a drill spindle, a main motor for rotating the spindle, a feed head having a guide in which the spindle is supported for rotative and axial movement with respect to the feed head, spindle feed means for axially moving said spindle, motion transmitting connections from said main motor to said spindle feed means whereby to power from the main motor the axial movement of said spindle at drill feed speeds, a clutch in said connections whereby to disengage said main motor from driving connection to said spindle feed means, a separate rapid traverse motor having motion transmitting connections to said spindle feed means, and interlocking means for disengaging one of said clutch and rapid traverse motor when the other is energized, said motion transmitting connections comprising a worm wheel and a worm engaged therewith, said clutch being connected to the worm at one side of its engagement with the worm wheel and the rapid traverse motor being connected to the worm at the other side of its engagement with the worm wheel whereby the worm is in the power train to the spindle regardless of whether it is operated by the main motor or by the rapid traverse motor.

2. The device of claim 1 in which said clutch is electrically operated, said interlocking means comprises a limit switch having multiple contacts and electric circuits to said clutch operator and said rapid traverse motor including said switch contacts, and means for actuating said switch in response to the rapid movement of the spindle.

3. The device of claim 2 in which the last mentioned means comprises a rod having a switch actuator cam, and axial motion transmitting connections between said rod and spindle.

4. An automatic drilling machine comprising a drill spindle, a main motor for rotating the spindle, a feed head having a guide in which the spindle is supported for rotative and axial movement with respect to the feed head, spindle feed means for axially moving said spindle, motion transmitting connections from said main motor to said spindle feed means whereby to power from the main motor the axial movement of said spindle at drill feed speeds, a clutch in said connections whereby to disengage said main motor from driving connection to said spindle feed means, a separate rapid traverse motor having motion transmitting connections to said spindle feed means, and interlocking means for disengaging one of said clutch and rapid traverse motor when the other is energized, said clutch being electrically operated, said interlocking means comprising a limit switch having multiple contacts and electric circuits to said clutch operator and said rapid traverse motor including said switch contacts, and means for actuating said switch in response to the rapid movement of the spindle, the last mentioned means comprising a rod having a switch actuator cam, and axial motion transmitting connections between said rod and spindle, said axial motion transmitting connections comprising a collar fixedly mounted on said rod and a magnet ring axially shiftable thereon, said spindle being provided with an arm having a path of movement on which said arm will axially shift the position of the magnet ring with respect to the collar to cause axial movement of the rod for actuation of said switch.

5. An automatic drilling machine comprising a drill spindle, a main motor for rotating the spindle, a feed head having a guide in which the spindle is supported for rotative and axial movement with respect to the feed head, spindle feed means for axially moving said spindle, motion transmitting connections from said main motor to said spindle feed means whereby to power from the main motor the axial movement of said spindle at drill feed speeds, a clutch in said connections whereby to disengage said main motor from driving connection to said spindle feed means, a separate rapid traverse motor having motion transmitting connections to said spindle feed means, electrical circuit connections to said clutch and said rapid traverse motor, a master selector switch in said circuit, said master selector switch having multiple contacts selectively connected in said electric circuits according to the position of the switch for selectively cycling said machine in an automatic drill cycle and an automatic tapping cycle.

6. The device of claim 5 in further combination with forward and reverse switching means for said spindle rotating main motor, said selector switch having an automatic tapping position in which the direction of spindle rotation is reversed to lead a tap out of a tapped hole and in which the circuit to the rapid traverse motor is opened to preclude actuation thereof.

7. The device of claim 5 in further combination with a dwell selector switch and time delay means in the circuit to the rapid traverse motor whereby operation of the rapid traverse motor in an upward direction will be delayed sufficiently to permit rotation of the drill at the bottom of a drilled hole prior to withdrawal of the drill from the hole.

8. An automatic drilling machine comprising a spindle, a feed head having a spindle support in which the spindle is mounted for rotative and axial movement, spindle feed means for axially moving said spindle, a main motor for powering the axial movement of the spindle at slow feed speeds and a rapid traverse motor, motion transmitting connections from said main motor and rapid traverse motor to said spindle feed means, and means for selectively driving said connections from said main motor and rapid traverse motor including first and second electric circuits respectively for the control of transmissions of power from the main motor to said spindle feed means and for the control of transmission of power from the rapid traverse motor to the spindle feed means, control switches in said circuits and means for actuating said control switches in response to the axial movement of the spindle.

9. The device of claim 8 in which the means for actuating said switches comprises means for concurrently closing one circuit and opening the other circuit whereby the respective circuit will be interlocked against simultaneous operation.

10. The device of claim 9 in which the driving connections from the main motor to the spindle feed means includes an electromagnetic clutch, said first circuit including a relay for actuating said clutch.

11. The device of claim 8 in which said main motor has driving connections to rotate said spindle, said connections being independent of its driving connections to said spindle feed means, reversing switches for said main motor and electrically operated reversing switch actuators, a master selector switch in said first and second electric circuits, and having in one position thereof contacts in circuit with said control switches and said reversing switch actuators whereby actuation of said control switches in response to the spindle reaching an extreme position will complete a circuit to reverse the direction of main motor operation, the connections to said rapid traverse motor through said selector switch being open in said position of said switch whereby a tap operated by the machine will lead out of a tapped hole and the possibility of the operation of the rapid traverse motor concurrently with the spindle feed means is precluded.

12. The device of claim 8 in which said actuating means comprises a control rod having cam means for switch actuation, a collar fixed to said rod and a magnet ring axially slidable on said rod, an arm mounted for axial movement with said spindle on a path in which said arm will selectively engage said magnet ring with said collar to shift the rod axially in one direction and retract said magnet ring away from said collar to shift the rod axially in the opposite direction.

13. In a control structure for apparatus of the character described, a control rod mounted for limited axial movement, a collar fixed to said rod, a magnet ring axially slidable on said rod, said magnet ring comprising an annulus having a central aperture greater in diameter than the diameter of the rod but of smaller diameter than the rod collar, an operating arm having an opening of greater diameter that said collar but smaller diameter than the magnet ring, the magnets in said magnet ring being effective to attract said ring to both the collar and the arm whereby the magnetic attraction of the ring to the arm is effective to transmit thrust from said arm to said rod in both directions of axial movement of the rod.

14. In an automatic drilling machine of the character described, the combination with a spindle feed head and spindle feed means in said head, of driving connections for said spindle feed means including a shaft, a rapid traverse motor having a connection to said shaft, an electromagnetic clutch having a connection to said shaft and a main motor connected to said electromagnetic clutch, and an electric circuit including connections to said rapid traverse motor and said clutch whereby the spindle drive means may be selectively driven from said main motor through said clutch and from said rapid traverse motor, said driving connections from said shaft to said spindle feed means comprising a worm wheel, and a worm on said shaft between its respective connections to the electromagnetic clutch and to the rapid traverse motor.

15. In a drilling machine having a top head comprising a housing for spindle rotating gears and an intermediate spindle feeding head, the improvement comprising a hollow feed quill, means mounting said quill in said feed head for axial movement, a drive sleeve telescopically within said quill and having means for rotatably mounting said sleeve in said top head in axially fixed position, a spindle telescopically within said quill, means rotatably connecting said spindle to said quill for axial movement therewith, a splined connection between the spindle and drive sleeve, and means for axially driving said quill whereby said quill and spindle will shift axially with respect to said drive sleeve without disengaging the drive sleeve from driving connection with the spindle, in combination with a pickoff gear in said top head and means connecting said pickoff gear to said drive sleeve on the axis of drive sleeve rotation.

16. The device of claim 15 in which the upper end of the spindle is axially spaced from the said pickoff gear in the uppermost position of the quill.

17. Apparatus for the control of the movement of a machine tool having power operating means, said apparatus comprising an actuating member, means transmitting motion to said actuating member in accordance with the movement of said tool, an actuated member in control connection with said power operating means, one of said members being provided with a magnet armature, and a magnet connected to the other member, said magnet and armature comprising means for communicating motion from the actuating member to the actuated member.

18. The device of claim 17 in which the member having the armature comprises an axially shiftable rod, said armature comprising a collar fixed to said rod, the other said member comprising an arm adjacent said rod, said magnet comprising a ring axially slidable on said rod.

19. The device of claim 17 in which one of said members comprises an axially shiftable rod, said magnet and armature comprising annuli coaxial with said rod.

20. In a machine tool having an actuating member movable in accordance with movements of a tool thereof and a control having an actuated member, one of said members being provided with a magnet armature, and a magnet connected to the other member, said magnet and armature comprising means for communicating motion from the actuating member to the actuated member, one of said members comprising an axially shiftable rod, said armature comprising a collar fixed to said rod, the other said member comprising a magnetic arm having an aperture through which said rod and collar are relatively axially movable, said magnet comprising a ring axially slidable with respect to the rod, said ring having an outer periphery larger than said arm aperture and an inner periphery smaller than the collar whereby said ring is impositively magnetically bonded to the arm and collar to transmit axial thrust to said rod through said collar in both directions of axial displacement between said arm and rod.

21. In an automatic drilling machine having a spindle, apparatus including a main motor for rotating the spindle, means for transmitting motion to the spindle from the main motor to feed the spindle axially, a rapid traverse motor, means for transmitting motion from the rapid traverse motor to the spindle to traverse the spindle axially, control means for said apparatus and comprising first and second control rods, means mounting said rods for limited axial movement, a rod shifter mounted for concurrent movement axially with said spindle, said rods having collars actuated by said rod shifter in the course of spindle movement whereby to shift said rods axially, means responsive to the axial shifting of said rods for selectively feeding the spindle by the main motor and traversing the spindle by the rapid traverse motor in a cycle of machine operation, the collars on the said first rod being disposed for actuation by said rod shifter near the extremes of movement of the spindle whereby to control transmission of power from said motors to the spindle at extreme spindle positions, the said second rod having a collar intermediate said extremes of movement of the spindle and substantially at the point in spindle movement where the tool carried thereby is proximate the work whereby said second control rod controls transmission of power from said motors to the spindle at said point.

22. The device of claim 21 in which actuation of the second rod in the downward direction of spindle movement concurrently discontinues transmission of power from the rapid traverse motor to the spindle and commences transmission of power from the main motor to the spindle at said point.

23. The device of claim 21 in which said rod shifter comprises a plate having an aperture through which said second rod extends, said collar on said second rod having a diameter smaller than the diameter of said aperture whereby to pass through said aperture in the course of movement of said rod shifter, and a magnet associated with said rod shifter whereby to magnetically affect said collar on movement of the actuator past said collar.

24. The device of claim 23 in which said magnet comprises a ring axially slidable with respect to said second rod, said ring having an outer periphery greater in diameter than said aperture and having an inner periphery smaller in diameter than the collar whereby said ring is impositively magnetically bonded to the shifter and collar to transmit axial thrust to said second rod through said collar in both directions of axial displacement between said shifter and rod.

25. In an automatic drilling machine having a spindle, apparatus including a main motor for rotating the spindle, means for transmitting motion to the spindle from the main motor to feed the spindle axially, a rapid traverse motor, means for transmitting motion from the rapid traverse motor to the spindle to traverse the spindle axially, control means for said apparatus and comprising first and second control rods, means mounting said rods for limited axial movement, a rod shifter mounted for concurrent movement axially with said spindle, said rods having collars actuated by said rod shifter in the course of spindle movement whereby to shift said rods axially, means responsive to the axial shifting of said rods for selectively feeding the spindle by the main motor and traversing the spindle by the rapid traverse motor in a cycle of machine operation, the collars on the said first rod being disposed for actuation by said rod shifter near the extremes of movement of the spindle whereby to control transmission of power from said motors to the spindle at extreme spindle positions, the said second rod having a collar intermediate said extremes of movement of the spindle and substantially at the point in spindle movement where the tool carried thereby is proximate the work whereby said second control rod controls transmission of power from said motors to the spindle at said point, in further combination with cycle selector means adjustable between an automatic drilling cycle and an automatic tapping cycle, actuation by said shifter of the lowermost collar on said first rod selectively reversing the direction of rotation of said main motor to lead a tap out of the tapped hole if the cycle selector is set for an automatic tapping cycle or discontinuing transmission of power from the main motor to the spindle and connecting the rapid traverse motor to the spindle to rapid traverse the spindle upwardly if the cycle selector is set for an automatic drilling cycle.

26. The device of claim 25 in which actuation of said second rod by the rod shifter in the upward movement of the spindle when the cycle selector is set for an automatic tapping cycle will discontinue transmission of power from said main motor to said spindle and will connect said rapid traverse motor to said spindle for rapid traversing of the spindle upwardly therebeyond.

27. In an automatic drilling machine having a spindle, apparatus including a main motor for rotating the spindle, means for transmitting motion to the spindle from the main motor to feed the spindle axially, a rapid transverse motor, means for transmitting motion from the rapid traverse motor to the spindle to traverse the spindle axially, control means for said apparatus and comprising first and second control rods, means mounting said rods for limited axial movement, a rod shifter mounted for concurrent movement axially with said spindle, said rods having collars actuated by said rod shifter in the course of spindle movement whereby to shift said rods axially, means responsive to the axial shifting of said rods for selectively feeding the spindle by the main motor and traversing the spindle by the rapid traverse motor in a cycle of machine operation, the collar on the said first rod being disposed for actuation by said rod shifter near the extremes of movement of the spindle whereby to control transmission of power from said motors to the spindle at extreme spindle positions, the said second rod having a collar intermediate said extremes of movement of the spindle and substantially at the point in spindle movement where the tool carried thereby is proximate the work whereby said second control rod controls transmission of power from said motors to the spindle at said point, in further combination with cycle selector means adjustable between automatic and manual cycling, said first rod being provided with a handle for its manual operation, and means responsive to the positioning of the cycle selector means for manual cycling to condition the control means for cycling pursuant to the manual manipulation of said handle.

References Cited in the file of this patent

UNITED STATES PATENTS

| | | |
|---|---|---|
| 1,665,411 | Galloway et al. | Apr. 10, 1928 |
| 2,167,673 | Oberhoffken | Aug. 1, 1939 |
| 2,269,064 | Rideout | Jan. 6, 1942 |
| 2,495,312 | Bickel et al. | Jan. 24, 1950 |
| 2,682,182 | Armitage | June 29, 1954 |